US009223729B2

(12) United States Patent
Attinella et al.

(10) Patent No.: US 9,223,729 B2
(45) Date of Patent: *Dec. 29, 2015

(54) SERVICING A GLOBALLY BROADCAST INTERRUPT SIGNAL IN A MULTI-THREADED COMPUTER

(71) Applicant: INTERNATIONAL BUSINESS MACHINES CORPORATION, Armonk, NY (US)

(72) Inventors: John E. Attinella, Rochester, MN (US); Kristan D. Davis, Rochester, MN (US); Roy G. Musselman, Rochester, MN (US); David L. Satterfield, Tewksbury, MA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 13/804,223

(22) Filed: Mar. 14, 2013

(65) Prior Publication Data

US 2014/0281090 A1   Sep. 18, 2014

Related U.S. Application Data

(63) Continuation of application No. 13/795,019, filed on Mar. 12, 2013.

(51) Int. Cl.
    *G06F 13/24* (2006.01)

(52) U.S. Cl.
    CPC .................................... *G06F 13/24* (2013.01)

(58) Field of Classification Search
    CPC ........................................................ G06F 13/24
    USPC ......................................... 710/260, 261, 263
    See application file for complete search history.

(56) References Cited

U.S. PATENT DOCUMENTS

| 5,983,308 | A | 11/1999 | Kerstein |
| 6,240,483 | B1 * | 5/2001 | Gutta et al. ................... 710/260 |
| 7,444,385 | B2 | 10/2008 | Blumrich et al. |
| 7,546,406 | B2 | 6/2009 | Armstrong et al. |
| 2008/0091867 | A1 * | 4/2008 | Plondke et al. ............... 710/261 |

* cited by examiner

*Primary Examiner* — Tim T Vo
*Assistant Examiner* — Phong H Dang
(74) *Attorney, Agent, or Firm* — Edward J. Lenart; James R. Nock; Kennedy Lenart Spraggins LLP

(57) ABSTRACT

Methods, apparatuses, and computer program products for servicing a globally broadcast interrupt signal in a multi-threaded computer comprising a plurality of processor threads. Embodiments include an interrupt controller indicating in a plurality of local interrupt status locations that a globally broadcast interrupt signal has been received by the interrupt controller. Embodiments also include a thread determining that a local interrupt status location corresponding to the thread indicates that the globally broadcast interrupt signal has been received by the interrupt controller. Embodiments also include the thread processing one or more entries in a global interrupt status bit queue based on whether global interrupt status bits associated with the globally broadcast interrupt signal are locked. Each entry in the global interrupt status bit queue corresponds to a queued global interrupt.

6 Claims, 5 Drawing Sheets

SERVICING A GLOBALLY BROADCAST INTERRUPT SIGNAL IN A MULTI-THREADED COMPUTER

CROSS-REFERENCE TO RELATED APPLICATION

This application is a continuation application of and claims priority from U.S. patent application Ser. No. 13/795,019, filed on Mar. 12, 2013.

STATEMENT REGARDING FEDERALLY SPONSORED RESEARCH OR DEVELOPMENT

This invention was made with Government support under Contract No. B579040 awarded by the Department of Energy. The Government has certain rights in this invention.

BACKGROUND OF THE INVENTION

1. Field of the Invention

The field of the invention is data processing, or, more specifically, methods, apparatuses, and computer program products for servicing a globally broadcast interrupt signal in a multi-threaded computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The creation of multi-threading processors has increased the complexity of processor architecture and thus increased the complexity of operating the processor. For example, computer hardware may generate a globally broadcast interrupt signal needed to be serviced by multiple threads. Because multiple threads may be available to process the interrupt signal at different times, the complexity of servicing the globally broadcast interrupt signal in a multi-threaded computer is increased.

SUMMARY OF THE INVENTION

Methods, apparatuses, and computer program products for servicing a globally broadcast interrupt signal in a multi-threaded computer comprising a plurality of processor threads. Embodiments include an interrupt controller indicating in a plurality of local interrupt status locations that a globally broadcast interrupt signal has been received by the interrupt controller. Embodiments also include a thread determining that a local interrupt status location corresponding to the thread indicates that the globally broadcast interrupt signal has been received by the interrupt controller. Embodiments also include the thread processing one or more entries in a global interrupt status bit queue based on whether global interrupt status bits associated with the globally broadcast interrupt signal are locked. Each entry in the global interrupt status bit queue corresponds to a queued global interrupt.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
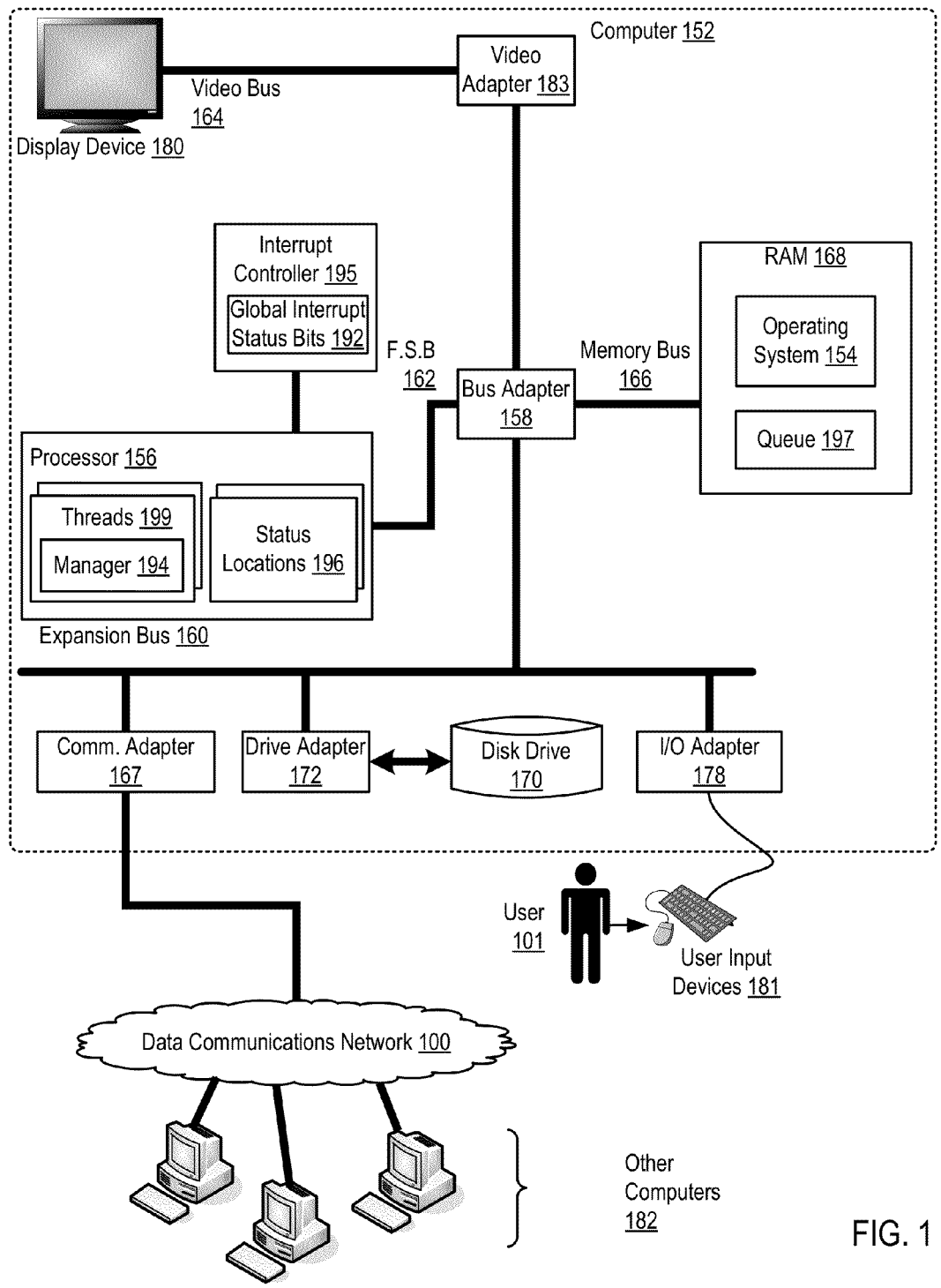
FIG. 1 sets forth a block diagram of automated computing machinery comprising an exemplary multi-threaded computer useful in servicing a globally broadcast interrupt signal according to embodiments of the present invention.

Exemplary methods, apparatuses, and computer program products for servicing a globally broadcast interrupt signal in a multi-threaded computer in accordance with the present invention are described with reference to the accompanying drawings, beginning with FIG. 1. Servicing a globally broadcast interrupt signal in a multi-threaded computer in accordance with the present invention is generally implemented with computers, that is, with automated computing machinery. FIG. 1 sets forth a block diagram of automated computing machinery comprising an exemplary multi-threaded computer (152) useful in servicing a globally broadcast interrupt signal according to embodiments of the present invention. The computer (152) of FIG. 1 includes at least one processor (156) or 'CPU' having multiple processor threads (199).

In the example of FIG. 1, only one multi-threaded processor is illustrated, however, multiple multi-threaded processors may be useful servicing a globally broadcast interrupt signal. Each thread in a multi-threaded computer typically shares the resources of a single core within the processor: the computing units, the CPU caches, and the translation lookaside buffers.

The computer (152) of FIG. 1 also includes an interrupt controller (195). An interrupt controller is automated computer circuitry configured to service a globally broadcast interrupt signal. Specifically, the interrupt controller (195) is configured to convert a globally broadcast interrupt signal into a plurality of individual interrupt signals and provide each individual interrupt signal to a specific thread of the processor (156). An interrupt is an asynchronous signal from hardware indicating a need for an action to be taken. In typical systems a hardware interrupt causes a processor to save its state of execution via a context switch, and begin execution of an interrupt handler. A context switch is a computing process that typically includes storing and restoring the state or context of a processor such that multiple processes or threads can share a single processor resource. Use of context switches is common in a multitasking operating system. Context switches are usually computationally intensive. A context switch typically may refer to any of the following: a register context switch, a task context switch, a thread context switch, or a process context switch.

In the example of FIG. 1, each thread of the processor (156) has an associated local interrupt status location (196) that is configured to store the status of the individual interrupt signal associated with the thread. During operation, the interrupt controller (195) is configured to indicate in a plurality of local interrupt status locations (196) that a globally broadcast interrupt signal has been received by the interrupt controller (201). Each thread of the processor (156) includes a manager (194) that includes computer program instructions for servicing a globally broadcast interrupt signal according to embodiments of the present invention. Specifically, the manager (194) includes computer program instructions that when executed by the thread cause the thread to determine that a local interrupt status location corresponding to the thread indicates that the globally broadcast interrupt signal has been received by the interrupt controller (195). The manager (194) is also configured to process one or more entries in a global interrupt status bit queue (197) based on whether global interrupt status bits (192) associated with the globally broadcast interrupt signal are locked.

The computer (152) also includes random access memory (168) ('RAM') which is connected through a high speed memory bus (166) and bus adapter (158) to the processor (156) and to other components of the computer (152). Stored in RAM (168) is the global interrupt status bit queue (197). The global interrupt status bit queue (197) is configured to store copies of the contents of the global interrupt status bits (192) as entries. That is, each entry in the global interrupt status bit queue (197) corresponds to a queued global interrupt. Queuing the contents of the global interrupt status bits (192) allows the global interrupt status bits (192) and the global interrupt to be cleared without each thread having first processed the global interrupt. By queuing the contents of the global interrupt status bits (192), a thread is able to process the queued status and then continue with other processes without waiting on other threads to process the global interrupt. That is, each thread can process the queued global interrupts without delaying other threads. In addition, the interrupt is 'saved' for other slower threads to process at a later time than the faster threads.

Also stored in RAM (168) is an operating system (154). Operating systems useful servicing a globally broadcast interrupt signal in a multi-threaded computer according to embodiments of the present invention include UNIX™, Linux™, Microsoft XP™, AIX™, IBM's i5/OS™, and others as will occur to those of skill in the art. The operating system (154) and the global interrupt status bit queue (197) in the example of FIG. 1 are shown in RAM (168), but many components of such software typically are stored in other locations within the computer (152), such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in multi-threaded computers for servicing a globally broadcast interrupt signal according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for servicing a globally broadcast interrupt signal in a multi-threaded computer according to embodiments of the present invention include modems for wired dial-up communications, Ethernet (IEEE 802.3) adapters for wired data communications network communications, and 802.11 adapters for wireless data communications network communications.

Figure 2:
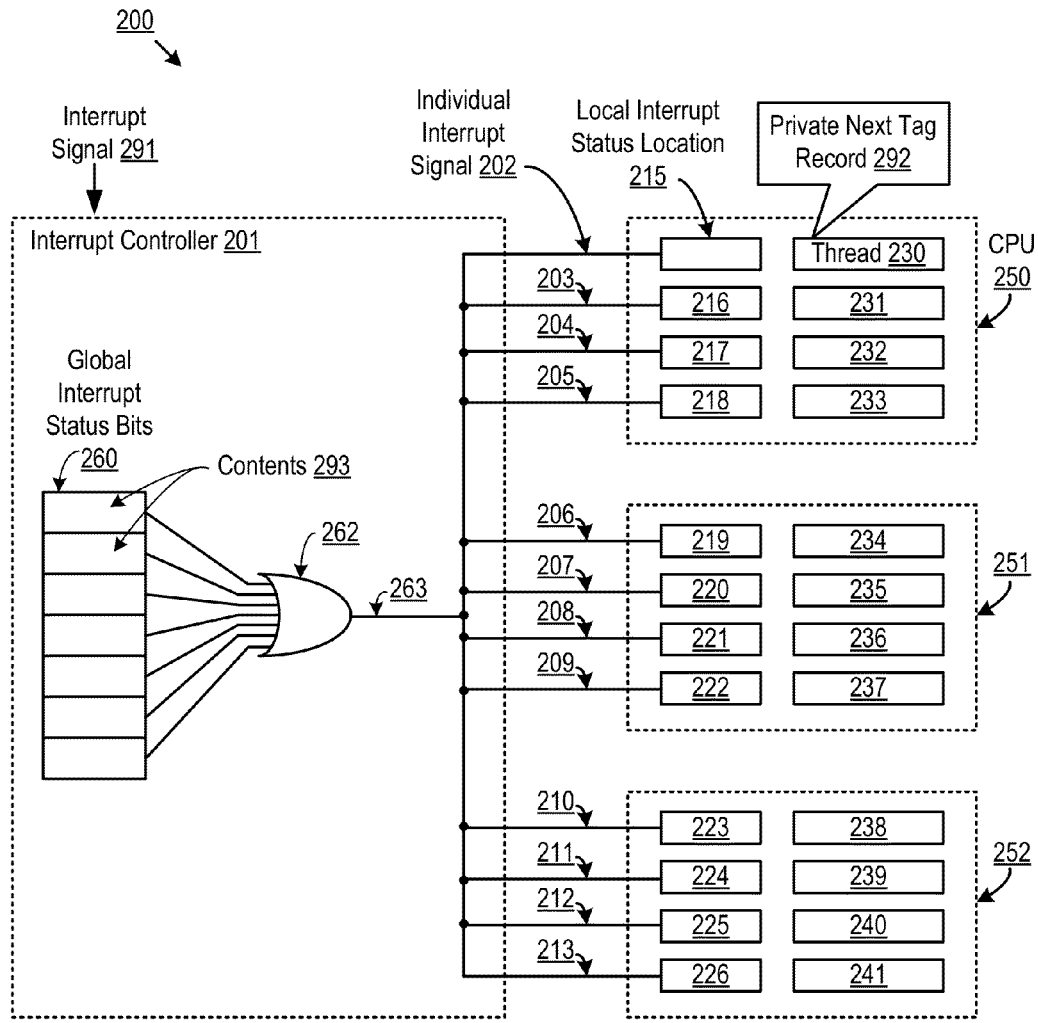
FIG. 2 sets forth a diagram of a system for servicing a globally broadcast interrupt signal in a multi-threaded computer according to embodiments of the present invention.
Figure 2:
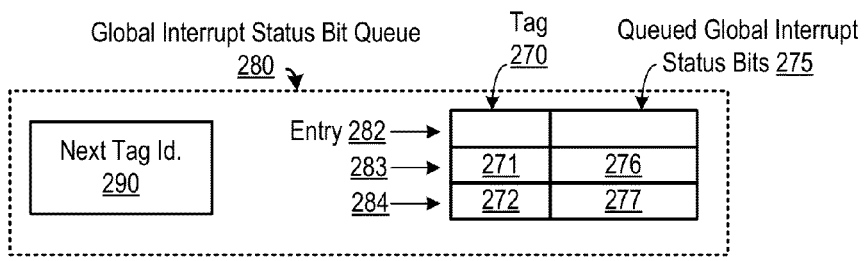

For further explanation, FIG. 2 sets forth a diagram of a system (200) for servicing a globally broadcast interrupt signal in a multi-threaded computer according to embodiments of the present invention. The system (200) of FIG. 2 includes processors (250, 251, 252) coupled to an interrupt controller (201).

The interrupt controller (201) includes automated computer circuitry for converting global interrupt status bits (260) associated with a globally broadcast interrupt signal (291) into individual interrupt signals (202-213). In the example of FIG. 2, the interrupt controller (201) includes an OR gate (262) that reads contents (293) of the global interrupt status bits (260) to generate a signal (263) that is distributed as individual interrupt signals to each the CPUs (250, 251, 252).

Each of the CPUs (250, 251, 252) includes multiple threads (230-241). Each thread has a corresponding local interrupt status location (215-226) configured to register an individual interrupt signal. During operation, the interrupt controller (201) indicates in the plurality of local interrupt status locations that a globally broadcast interrupt signal has been received by the interrupt controller (201). As will be explained in greater detail below, each local interrupt status location preserves the state of the individual broadcast interrupt signal until the thread associated with the interrupt status location has serviced the interrupt signal. Because the bits stored in the local interrupt status location are reset only by the target thread, the local interrupt status location helps the interrupt be delivered to that thread even after the original globally broadcast interrupt signal has been reset.

During operation, a thread determines if the local interrupt status location indicates that the globally broadcast interrupt signal has been received by the interrupt controller (201). In response to determining that the local interrupt status location indicates that the globally broadcast interrupt signal has been received by the interrupt controller (201), a thread processes an interrupt based on a variety of parameters.

In one particular embodiment, in response to determining that the local interrupt status location indicates that the globally broadcast interrupt signal has been received by the interrupt controller (201), a thread processes an interrupt by first determining whether the global interrupt status bits (260) are locked. A thread may determine whether the global interrupt status bits (260) by examining a lock bit (not shown). For example, if the lock bit is set, the global interrupt status bits (260) are locked and if the lock bit is not set, the global interrupt status bits (260) are not locked.

If the global interrupt status bits (260) are locked, the thread operates as a 'follower thread' and waits to process a queued interrupt until the global interrupt status bits are not locked. If a thread determines that the global interrupt status bits (260) are not locked, the thread next examines the global interrupt status bits (260) to determine if the globally broadcast interrupt signal is active. A globally broadcast interrupt signal is active if the global interrupt status bits have not been cleared. If the global interrupt status bits (260) indicate that the globally broadcast interrupt signal is not active, the thread operates as a 'follower thread' and processes one or more queued interrupts. If the global interrupt status bits (260) indicate that the globally broadcast interrupt signal is still active, the thread operates as a 'leader thread' and locks the global interrupt status bits (260).

Subsequent to locking the global interrupt status bits (260), the leader thread queues the contents (293) of the global interrupt status bits (260) into an entry of a global interrupt status bit queue (280) and clears the contents (293) of the global interrupt status bits (260). After the global interrupt status bits (260) are cleared, the leader thread releases the lock on the global interrupt status bits (260) and processes any queued interrupts stored in the global interrupt status bit queue (280). That is, during operation, each global interrupt as recorded by the contents (293) of the global interrupt status bits (260), is queued by the first thread (i.e., the leader thread) in response to an individual interrupt signal indicated in a local interrupt status location.

Queuing the contents (293) of the global interrupt status bits (260) allows the global interrupt status bits (260) to be cleared without each thread having first processed the global interrupt. By queuing the contents (293) of the global interrupt status bits (260), a thread is able to process the queued interrupt and then continue with other activities without waiting on other threads to process the global interrupt. That is, each thread can process the queued global interrupts without holding up other threads.

Furthermore, because multiple global interrupts may be queued before a particular thread is free from other processing to examine the global interrupt status bit queue (280), when the particular thread does examine the global interrupt status bit queue (280), the particular thread may have multiple queued global interrupts to process. That is, the global interrupt status bit queue (280) may contain multiple entries (282, 283, 284) that the particular thread has yet to process. Although only three entries (282, 283, 284) are included in the global interrupt status bit queue (280), according to embodiments of the present invention, the queue (280) may be configured to store any number of entries.

As indicated above, the global interrupt status bit queue (280) is configured to store copies of the contents (293) of the global interrupt status bits (260) as entries (282, 283, 284). Each entry (282, 283, 284) in the global interrupt status bit queue (280) corresponds to a queued global interrupt. In the example of FIG. 2, each entry (282, 283, 284) in the global interrupt status bit queue (280) includes a tag (270, 271, 272) and queued global interrupt status bits (275, 276, 277). In a particular embodiment, the number of entries in the global interrupt status bit queue is fixed and therefore the entries within the global interrupt status bit queue eventually are overwritten with new tags and new queued global interrupt status bits.

To keep track of which entries have been processed and which have not been processed, each thread may maintain a private next tag record (292). A private next tag record (292) may indicate the 'next tag' within an entry that the particular thread expects to process next. For example, as part of processing queued global interrupts, a thread may examine the next entry within the global interrupt status bit queue (280) that the thread has not processed. The thread may retrieve the 'tag' associated with the next entry and determine if the private next tag record (293) matches the tag retrieved from the next entry. If the tag is null, then there are no more entries to process. If the two tags match, the thread processes that entry along with any other subsequent entries. If however the two tags do not match, then the thread has missed some queued global interrupts. That is, the entries within the global interrupt status bit queue (280) have already been written over. In this instance, the thread may register that some number of global interrupts occurred but were not processed (i.e., the thread did not receive or process the global interrupt status bits associated with one or more globally broadcast interrupt signals.

Figure 3:
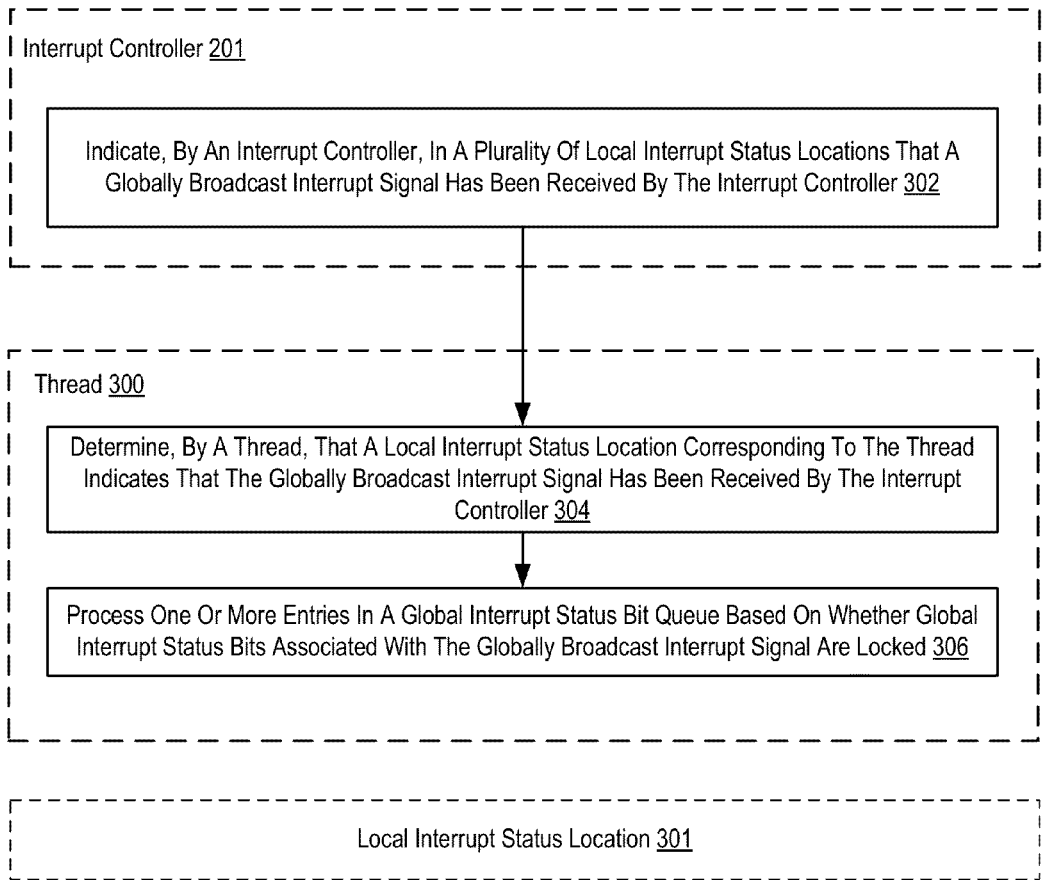
FIG. 3 sets forth a flow chart illustrating an exemplary method for servicing a globally broadcast interrupt signal in a multi-threaded computer according to embodiments of the present invention.

For further explanation, FIG. 3 sets forth a flow chart illustrating an exemplary method for servicing a globally broadcast interrupt signal in a multi-threaded computer according to embodiments of the present invention. For ease of explanation, some of the components of the system (200) of FIG. 2 are referenced in the description of the method of FIG. 3.

The method of FIG. 3 includes an interrupt controller (301) indicating (302) in a plurality of local interrupt status locations (215-226) that a globally broadcast interrupt signal has been received by the interrupt controller (201). Indicating (302) in a plurality of local interrupt status locations (215-226) that a globally broadcast interrupt signal has been received by the interrupt controller (201) may be carried out by setting one or more bits within the local interrupt status location in response to receiving an individual interrupt signal.

The method of FIG. 3 also includes a thread (300) determining (304) that a local interrupt status location (301) corresponding to the thread (300) indicates that the globally broadcast interrupt signal has been received by the interrupt controller (201). Determining (304) that a local interrupt status location (301) corresponding to the thread (300) indicates that the globally broadcast interrupt signal has been received by the interrupt controller (201) may be carried out by examining one or more bits within the local interrupt status location (301). For example, if one or more bits within the local interrupt status location (301) are set, then an individual interrupt signal has been received by the thread and thus the globally broadcast interrupt signal has been received by the interrupt controller (201).

The method of FIG. 3 also includes the thread (300) processing (306) one or more entries (282, 283, 284) in a global interrupt status bit queue (280) based on whether global interrupt status bits (260) associated with the globally broadcast interrupt signal (291) are locked. Processing (306) one or more entries (282, 283, 284) in a global interrupt status bit queue (280) based on whether global interrupt status bits (260) associated with the globally broadcast interrupt signal (291) are locked may be carried out by examining a lock bit or bits associated with the global interrupt status bits (260); and based on the examination either waiting to process entries within the global interrupt status bit queue until the global interrupt status bits are not locked or processing the entries.

Figure 4:
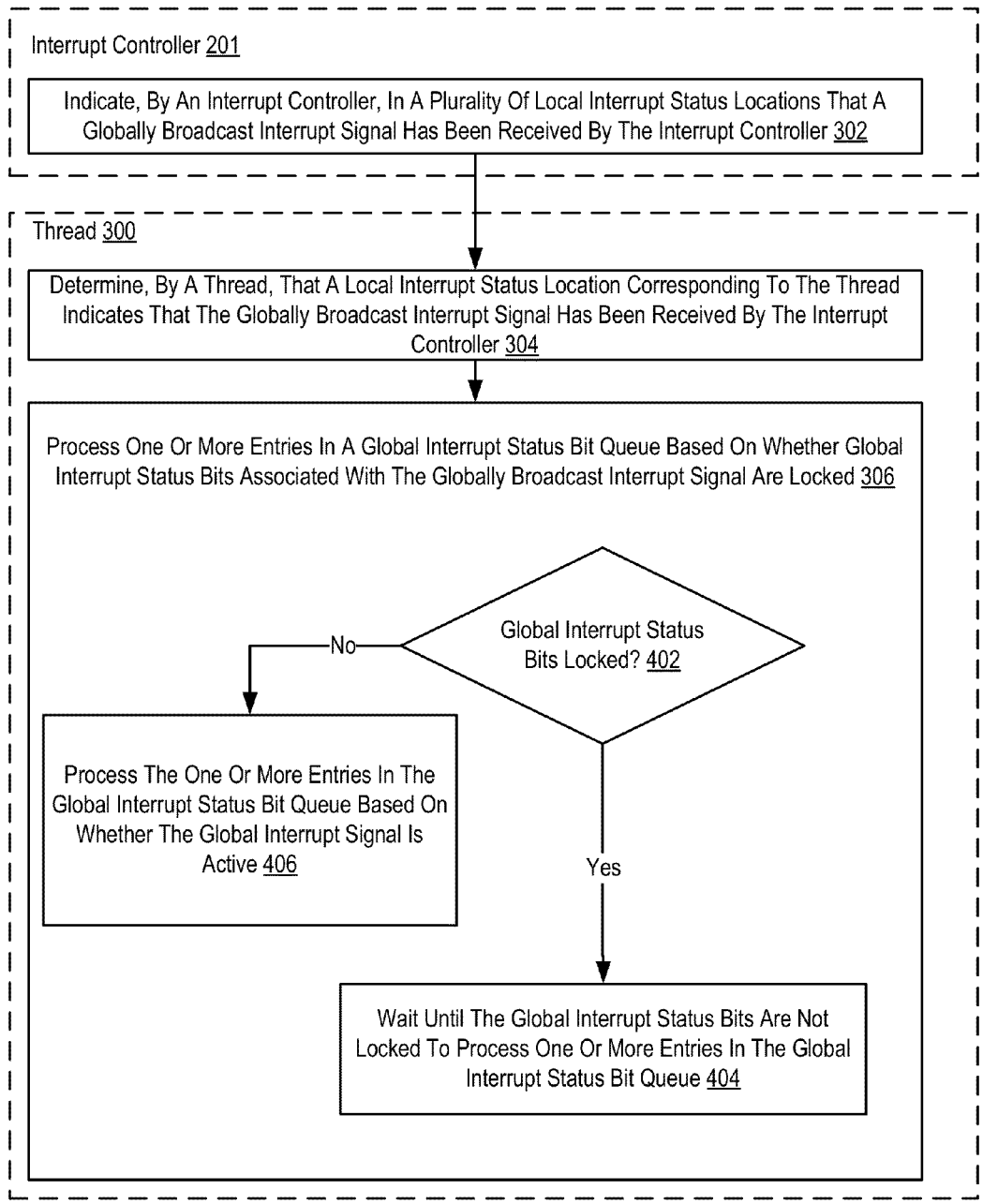
FIG. 4 sets forth a flow chart illustrating another exemplary method for servicing a globally broadcast interrupt signal in a multi-threaded computer according to embodiments of the present invention.

For further explanation, FIG. 4 sets forth a flow chart illustrating a further exemplary method for servicing a globally broadcast interrupt signal in a multi-threaded computer according to embodiments of the present invention. The method of FIG. 4 is similar to the method of FIG. 3 in that the method of FIG. 4 also includes indicating (302) in a plurality of local interrupt status locations (215-226) that a globally broadcast interrupt signal has been received by the interrupt controller (201); determining (304) that a local interrupt status location (301) corresponding to the thread (300) indicates that the globally broadcast interrupt signal has been received by the interrupt controller (201); and processing (306) one or more entries (282, 283, 284) in a global interrupt status bit queue (280) based on whether global interrupt status bits (260) associated with the globally broadcast interrupt signal (291) are locked.

In the method of FIG. 4, however, processing (306) one or more entries (282, 283, 284) in a global interrupt status bit queue (280) includes determining (402) whether the global interrupt status bits (260) associated with the globally broadcast interrupt signal are locked. Determining (402) whether the global interrupt status bits (260) associated with the globally broadcast interrupt signal are locked may be carried out by examining a lock bit or bits associated with the global interrupt status bits (260).

If the global interrupt status bits (260) are locked, the method of FIG. 4 continues by waiting (404) until the global interrupt status bits (260) are not locked to process one or more entries (282, 283, 284) in the global interrupt status bit queue (280). Waiting (404) until the global interrupt status bits (260) are not locked to process one or more entries (282, 283, 284) in the global interrupt status bit queue (280) may be carried out by periodically checking the status of a lock bit associated with the global interrupt status bits (260).

If the global interrupt status bits (260) are not locked, the method of FIG. 4 continues by processing (406) the one or more entries (282, 283, 284) in the global interrupt status bit queue (280) based on whether the globally broadcast interrupt signal is active. Processing (406) the one or more entries (282, 283, 284) in the global interrupt status bit queue (280) based on whether the globally broadcast interrupt signal is active may be carried out by examining the global interrupt status bits (260); and based on the examination, either operating as a 'follower thread' and processing the entries currently in the queue (280) or operating as a 'leader thread' and queuing another entry into the queue (280) before processing the entries in the queue (280).

Figure 5:
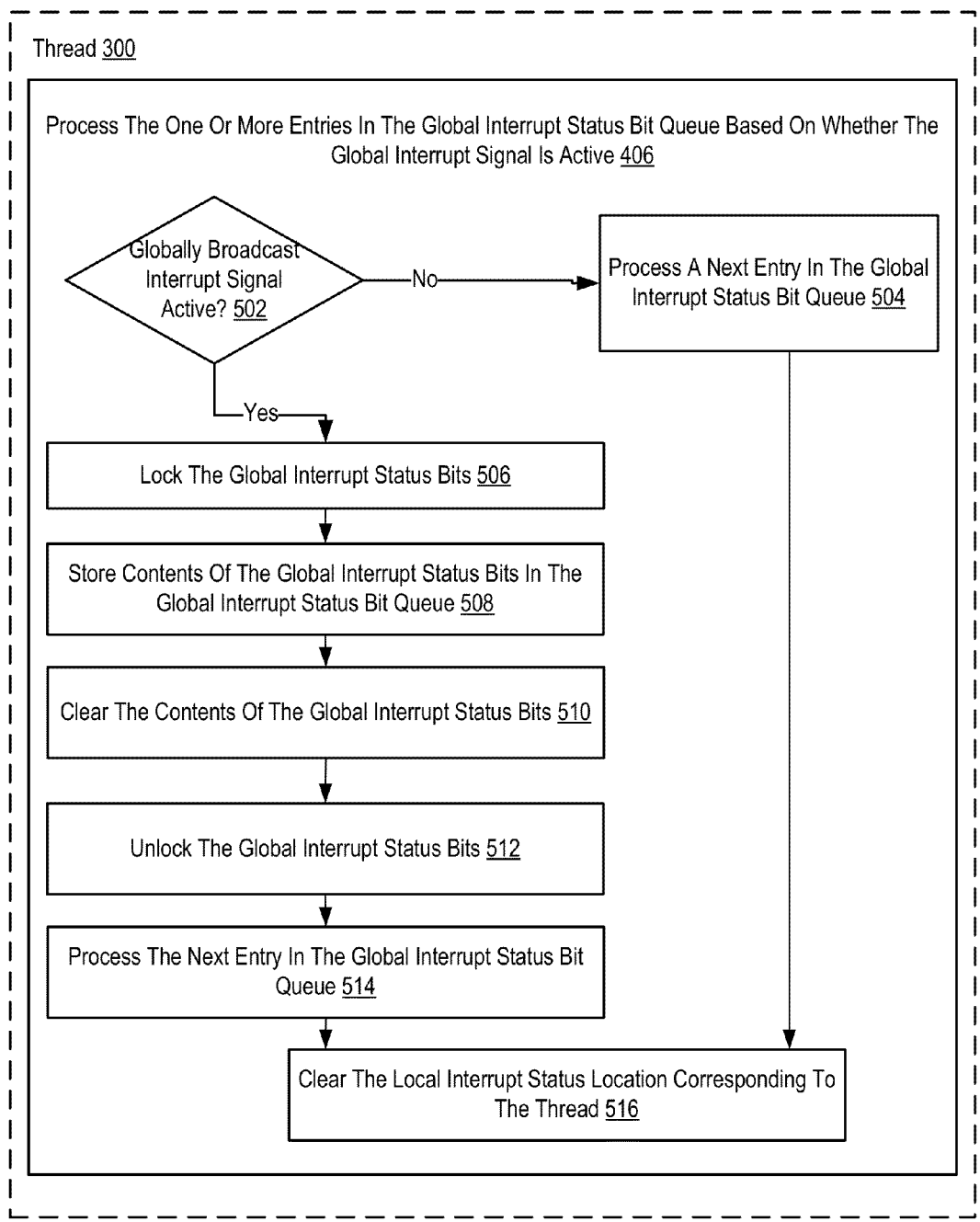
FIG. 5 sets forth a flow chart illustrating another exemplary method for servicing a globally broadcast interrupt signal in a multi-threaded computer according to embodiments of the present invention.

For further explanation, FIG. 5 sets forth a flow chart illustrating a further exemplary method for servicing a globally broadcast interrupt signal in a multi-threaded computer according to embodiments of the present invention. The method of FIG. 5 is similar to the method of FIG. 4 in that the method of FIG. 5 also includes if the global interrupt status bits (260) are not locked, processing (406) the one or more entries (282, 283, 284) in the global interrupt status bit queue (280) based on whether the globally broadcast interrupt signal is active.

In the method of FIG. 5, however, processing (406) the one or more entries (282, 283, 284) in the global interrupt status bit queue (280) based on whether the globally broadcast interrupt signal is active includes determining (502) whether the globally broadcast interrupt signal is active. Determining (502) whether the globally broadcast interrupt signal is active may be carried out by examining the contents (293) of the global interrupt status bits (260); determining that the globally broadcast interrupt signal is not active if the contents (293) are cleared; and determining that the globally broadcast interrupt signal is active if the contents (293) are not cleared.

If the globally broadcast interrupt signal is not active, the method of FIG. 5 continues by processing (504) a next entry in the global interrupt status bit queue (260). Processing (504) a next entry in the global interrupt status bit queue (260) may be carried out by retrieving the tag and queued global interrupt status bits corresponding to the entry.

If the globally broadcast interrupt signal is active, the method of FIG. 5 continues by locking (506) the global interrupt status bits (260). Locking (506) the global interrupt status bits (260) may be carried out by setting one or more lock bits associated with the global interrupt status bits (260).

The method of FIG. 5 also includes subsequent to locking (506) the global interrupt status bits (260), storing (508) contents (293) of the global interrupt status bits (260) in the global interrupt status bit queue (280). Storing (508) contents (293) of the global interrupt status bits (260) in the global interrupt status bit queue (280) may be carried out by storing data representing the contents (293) of the global interrupt status bits (260) into an entry within the queue (280).

The method of FIG. 5 also includes clearing (510) the contents (293) of the global interrupt status bits (260) in response to storing (508) the contents (293) of the global interrupt status bits (260). Clearing (510) the contents (293) of the global interrupt status bits (260) may be carried out by changing data within the contents (293) of the global interrupt status bits (260).

The method of FIG. 5 also includes unlocking (512) the global interrupt status bits (260) in response to clearing (510) the contents (293) of the global interrupt status bits (260). Unlocking (512) the global interrupt status bits (260) may be carried out by unsetting one or more lock bits associated with the global interrupt status bits (260).

The method of FIG. 5 also includes processing (514) the next entry in the global interrupt status bit queue (280) in response to clearing (510) the contents (293) of the global interrupt status bits (260). Processing (514) the next entry in the global interrupt status bit queue (280) may be carried out by retrieving the tag and queued global interrupt status bits corresponding to the entry.

The method of FIG. 5 also includes clearing (516) the local interrupt status location (301) corresponding to the thread (300) in response to completing processing of the one or more entries in the global interrupt status bit queue (280). Clearing (516) the local interrupt status location (301) corresponding to the thread (300) may be carried out by changing one or more bits within the local interrupt status location (301).

Exemplary embodiments of the present invention are described largely in the context of a fully functional computer system for servicing a globally broadcast interrupt signal in a multi-threaded computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of servicing a globally broadcast interrupt signal in a multi-threaded computer, the multi-threaded computer comprising a plurality of processor threads, the method comprising:

indicating, by an interrupt controller, in a plurality of local interrupt status locations that a globally broadcast interrupt signal has been received by the interrupt controller, each local interrupt status location corresponding to a particular thread;

determining, by a thread, that a local interrupt status location corresponding to the thread indicates that the globally broadcast interrupt signal has been received by the interrupt controller; and in response to determining that the local interrupt status location indicates that the globally broadcast interrupt signal has been received by the interrupt controller, processing one or more entries in a global interrupt status bit queue based on whether global interrupt status bits associated with the globally broadcast interrupt signal are locked, each entry in the global interrupt status bit queue corresponding to a queued global interrupt, wherein processing one or more entries in the global interrupt status bit queue based on whether global interrupt status bits associated with the globally broadcast interrupt signal are locked includes:

determining, by the thread, whether the global interrupt status bits associated with the globally broadcast interrupt signal are locked;

if the global interrupt status bits are not locked, processing the one or more entries in the global interrupt status bit queue based on whether the globally broadcast interrupt signal is active, wherein processing the one or more entries in the global interrupt status bit queue based on whether the globally broadcast interrupt signal is active includes:

determining, by the thread, whether the globally broadcast interrupt signal is active;

if the globally broadcast interrupt signal is active:

locking, by the thread, the global interrupt status bits;

subsequent to locking the global interrupt status bits, storing, by the thread, contents of the global interrupt status bits in the global interrupt status bit queue;

in response to storing the contents of the global interrupt status bits, clearing, by the thread, the contents of the global interrupt status bits; and in response to clearing the contents of the global interrupt status bits, unlocking, by the thread, the global interrupt status bits and processing the next entry in the global interrupt status bit queue.

2. The method of claim 1 wherein processing one or more entries in the global interrupt status bit queue based on whether global interrupt status bits associated with the globally broadcast interrupt signal are locked further includes:

if the global interrupt status bits are locked, waiting, by the thread, until the global interrupt status bits are not locked to process one or more entries in the global interrupt status bit queue.

3. The method of claim 2 wherein processing the one or more entries in the global interrupt status bit queue based on whether the globally broadcast interrupt signal is active further includes:

if the globally broadcast interrupt signal is not active, processing a next entry in the global interrupt status bit queue.

4. The method of claim 1 further comprising in response to completing processing of the one or more entries in the global interrupt status bit queue, clearing, by the thread, the local interrupt status location corresponding to the thread.

5. The method of claim 1 wherein each entry in the global interrupt status bit queue includes a tag, wherein the global interrupt status bit queue includes a next tag identifier indicating a next tag to enter; wherein the next tag identifier increments with each new entry added to the global interrupt status bit queue.

6. The method of claim 5 wherein each thread maintains a private next tag record indicating a next tag past a last tag processed by the thread.

\* \* \* \* \*